(No Model.)
B. HAMMER.
ALCOHOL COOKING STOVE.
No. 426,802. Patented Apr. 29, 1890.
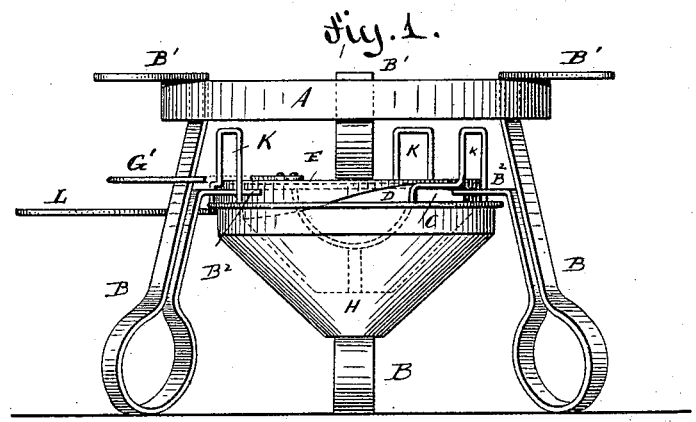
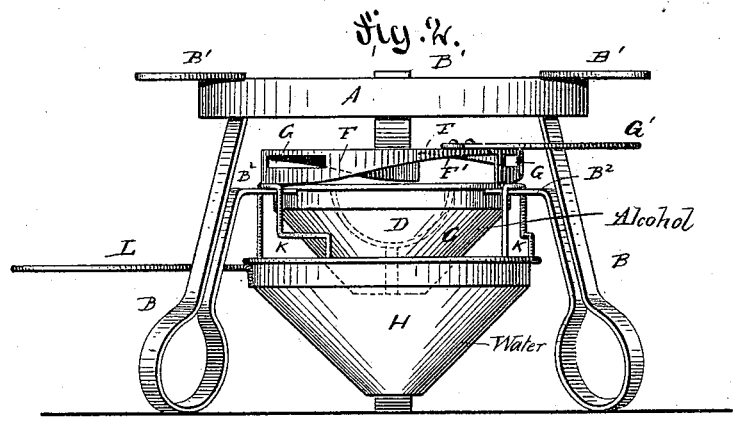
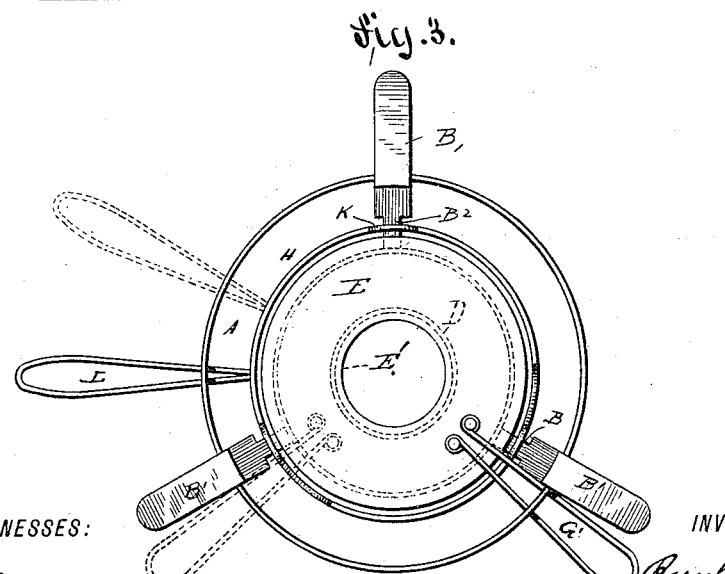
WITNESSES:
INVENTOR
Bernhard Hammer
BY
ATTORNEYS

UNITED STATES PATENT OFFICE.

BERNHARD HAMMER, OF LUDWIGSBURG, WÜRTEMBERG, GERMANY.

ALCOHOL COOKING-STOVE.

SPECIFICATION forming part of Letters Patent No. 426,802, dated April 29, 1890.

Application filed June 18, 1889. Serial No. 314,733. (No model.)

*To all whom it may concern:*

Be it known that I, BERNHARD HAMMER, of Ludwigsburg, Würtemberg, Germany, a citizen of the German Empire, have invented certain new and useful Improvements in Alcohol Cooking-Stoves, of which the following is a specification.

This invention relates to improvements in alcohol cooking-stoves; and the object of my invention is to provide a stove of this kind in which the flame can readily be regulated, and in which the alcohol is cooled by water to prevent overheating and explosion.

The invention consists in the combination, with a suitable supporting frame having legs provided with inwardly-projecting lugs, of an alcohol-vessel, a cooling-water receptacle, and a cover supported by said inwardly-projecting lugs on the legs.

The invention also consists in the construction and combination of parts and details, as will be fully described hereinafter, and finally be pointed out in the claims.

In the accompanying drawings, Figure 1 is a side elevation of my improved alcohol-stove, the cover being lowered so as to extinguish the flame, and the water-receptacle being raised and parts being broken out. Fig. 2 is a similar view, the cover being raised and the water-receptacle lowered. Fig. 3 is a plan view.

Similar letters of reference indicate corresponding parts.

The frame of the stove consists of a top-ring A, supported by three legs B, bent over at the top to form the lugs B' for supporting the vessel containing the liquid to be heated or cooked, and the upper ends of the inner shanks of the legs are bent over to form lugs $B^2$ a short distance below the ring A, which legs serve to support the burner proper. This burner proper consists of a funnel-shaped vessel C, open at the top and provided with a semi-spherical central cup D, which remains empty, the alcohol surrounding it, so that the flame will be annular.

The cover E is provided with a flange F, having three or more or less beveled notches F' in its bottom edge, and said flange also has slots G for the entrance of air to produce a better combustion. The bottom edge of said flange rests upon the lugs $B^2$, and the cover is provided with a handle G' for turning it.

The funnel-shaped vessel H contains the water for cooling the alcohol, and is of such size that the vessel C can pass into it. This vessel H has a series of wire hangers K, which are made L-shaped, and through which the lugs $B^2$ pass. The vessel H has a handle L for raising and turning it. The alcohol is filled into the vessel C and a quantity of water is poured into the vessel H. When the vessel H is in the position shown in Fig. 2, it is in its lowest position. It is then raised until the horizontal shanks of the L-shaped hangers K are above the lugs $B^2$, and then the vessel is turned in such a manner that the lugs $B^2$ pass into the horizontal shanks of the hangers K, whereby said vessel H is held in raised position, as shown in Fig. 1, and can thus cool the alcohol and prevent overheating and explosion of the same. The alcohol is ignited and burns with an annular flame, which flame passes through the central aperture E' of the cover E. The flame can be regulated by turning the cover E. When the highest parts of the flange F rests on the lugs $B^2$, the cover will be raised as high as possible above the top of the alcohol-vessel C, and the flame will have its maximum size. By turning the cover in such a manner that the lower parts of the flange E rest upon the lugs $B^2$ the cover is lowered and the size of the flame decreased, and finally when the shortest parts of the flange E rest upon the lugs $B^2$ the cover will rest on the top edge of the vessel C and the flame will be extinguished. I am thus enabled to control the flame or extinguish the same entirely by simply turning the cover more or less.

Having thus described my invention, I claim as new and desire to secure by Letters Patent—

1. In an alcohol-burner, the combination, with a top-ring, of supporting-legs having inwardly-projecting lugs, an alcohol-vessel, supported on said lugs, a cover for said alcohol-vessel resting on said lugs, and a water-receptacle surrounding the alcohol-vessel and also supported by said lugs, substantially as set forth.

2. In an alcohol-burner, the combination, with a supporting-frame, of an alcohol-vessel supported by said frame, and a vertically-adjustable water-receptacle surrounding the alcohol-vessel and also supported by the frame, substantially as set forth.

3. In an alcohol-burner, the combination, with a supporting-frame having legs provided with inwardly-projecting lugs, of an alcohol-vessel resting on said lugs, and a water-receptacle surrounding the alcohol-vessel and provided with L-shaped hangers, through which the said lugs also pass, substantially as set forth.

In testimony that I claim the foregoing as my invention I have signed my name in presence of two subscribing witnesses.

BERNH. HAMMER.

Witnesses:
CARL FISCHER,
WILHELM BEILSTEIN.